April 12, 1949. J. J. SLOMER 2,467,238
FLUID PRESSURE CABLE REEL DRIVE
Filed May 1, 1946 2 Sheets-Sheet 1

INVENTOR
Joseph J. Slomer
Clarence F. Poole
ATTORNEY

April 12, 1949. J. J. SLOMER 2,467,238
FLUID PRESSURE CABLE REEL DRIVE
Filed May 1, 1946 2 Sheets-Sheet 2
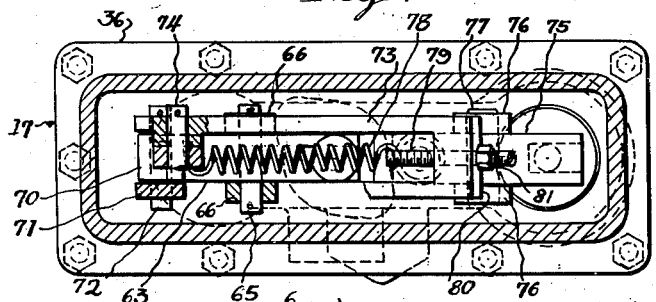
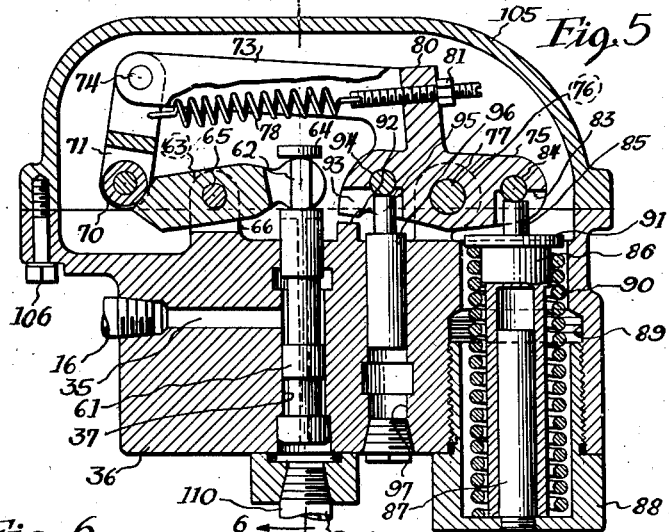
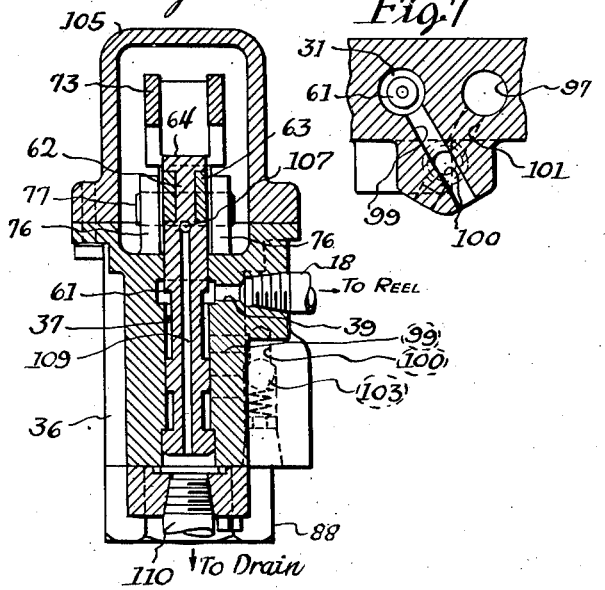
INVENTOR
Joseph J. Slomer
Clarence F. Poole
ATTORNEY Patented Apr. 12, 1949

2,467,238

UNITED STATES PATENT OFFICE 2,467,238

FLUID PRESSURE CABLE REEL DRIVE

Joseph J. Slomer, Chicago, Ill., assignor to Goodman Manufacturing Company, Chicago, Ill., a corporation of Illinois Application May 1, 1946, Serial No. 666,467

9 Claims. (Cl. 242—90)

This invention relates to improvements in fluid pressure systems particularly adapted to control operation of the brakes and cable reel of a mine locomotive of the gathering type.

Heretofore mine locomotives of the gathering type have been supplied with power when beyond the trolley by means of an electric cable connected at its free end to a source of power supply and wound on or payed off of a reel, as the locomotive moves towards or from the source of power. The reel has usually been driven by an independent electric motor of the series type, so arranged as to pick up cable as the speed of the locomotive increases and tension on the cable decreases, and is usually directly connected with the cable reel and maintains tension on the cable during the unwinding operation when the locomotive is moving away from the source of power. The cable reel has also been driven by a fluid operated motor which maintains tension on the cable by being driven as a pump by the reel during the unwinding operation. A direct drive from the locomotive wheels to the cable reel has also been provided. The electric motor and fluid motor driving means for the reel have never been entirely satisfactory because the drive to the cable reel is interrupted when power is cut from the electric motor or from the motor driving the pump which supplies power to the fluid motor. The direct drive to the reel has also not been satisfactory because the reel cannot be driven from the locomotive when the brakes are applied to slip the wheels, which is quite frequent in gathering operations. The result is that the locomotive frequently runs over its cable and cuts it in two. This causes heavy arcing when the circuit to the cable is again completed, or if the cable is not cut in two and the conductors of the cable are not exposed, it weakens the cable at the point where it is run over, with the result that the cable is likely to break or short circuit during operation of the locomotive. For this reason cable reel locomotives have never been approved by the Bureau of Mines for operation in gassy mines.

In carrying out my invention I provide a fluid pressure system for a gathering locomotive including a pump driven by electric power conducted to the locomotive by the cable reel, with fluid connections from said pump for supplying fluid under pressure to operate a cable reel to wind in an electric cable when the locomotive moves towards its source of power, and with other fluid connections for supplying fluid under pressure to operate the locomotive brakes of certain other operative parts of the locomotive. I also provide a fluid pump driven by an axle of the locomotive for supplying fluid under pressure to operate the reel when the first pump is not in operation due to an interruption in the electric circuit to the drive motor therefor. A fluid series and pressure regulating valve is also connected between the fluid pressure lines for supplying fluid under pressure to the brakes and to the reel. Said valve is so arranged as to block the flow of fluid from the pump to the fluid motor for driving the reel, when pressure in the pressure line to the brakes drops below a predetermined value. The fluid pressure system is also so arranged that the second pump will supply fluid under pressure to drive the reel when the pressure regulating valve closes the circuit from the first pump to the fluid motor for driving the reel, to maintain pressure in the pressure line for the brakes, and the first pump will supply fluid under pressure to drive the reel when the second pump is not in operation due to slippage of the locomotive wheels.

My invention has as its principal objects to provide a fluid pressure system for driving a cable reel of a cable reel locomotive in a winding direction when the locomotive is moving towards its source of power and for maintaining tension on the cable during the unwinding operation and stalling of the locomotive, which is so arranged that the reel drive motor is supplied with fluid under pressure when the electric circuit to the locomotive is broken and the locomotive is traveling towards its source of power, and which also provides power to pick up the cable when the locomotive wheels slide.

A more specific object of my invention is to provide a fluid pressure system for supplying fluid under pressure to a fluid motor, for driving a cable reel of a mine locomotive including one pump driven by power derived from the cable which supplies power to the locomotive and another pump driven from one of the locomotive axles upon movement of the locomotive along the track, so as to assure that fluid pressure will be supplied to the cable reel drive motor to drive the cable reel in a winding direction as long as the locomotive moves toward its source of power.

These and other objects of my invention will appear from time to time as the following specification proceeds and with reference to the accompanying drawings wherein:

Figure 4 is a horizontal sectional view taken through the top cover of the pressure regulating valve;

Figure 5 is a longitudinal sectional view of the pressure regulating valve somewhat similar to Figure 2, but showing the valve in a different position of adjustment than in Figure 2;

Figure 6 is an enlarged fragmentary transverse sectional view taken substantially along line 6—6 of Figure 5; and Figure 7 is an enlarged detail sectional view taken substantially along line 7—7 of Figure 2, showing certain details of the fluid connections leading from one chamber to the other of the valve.

Figure 1:
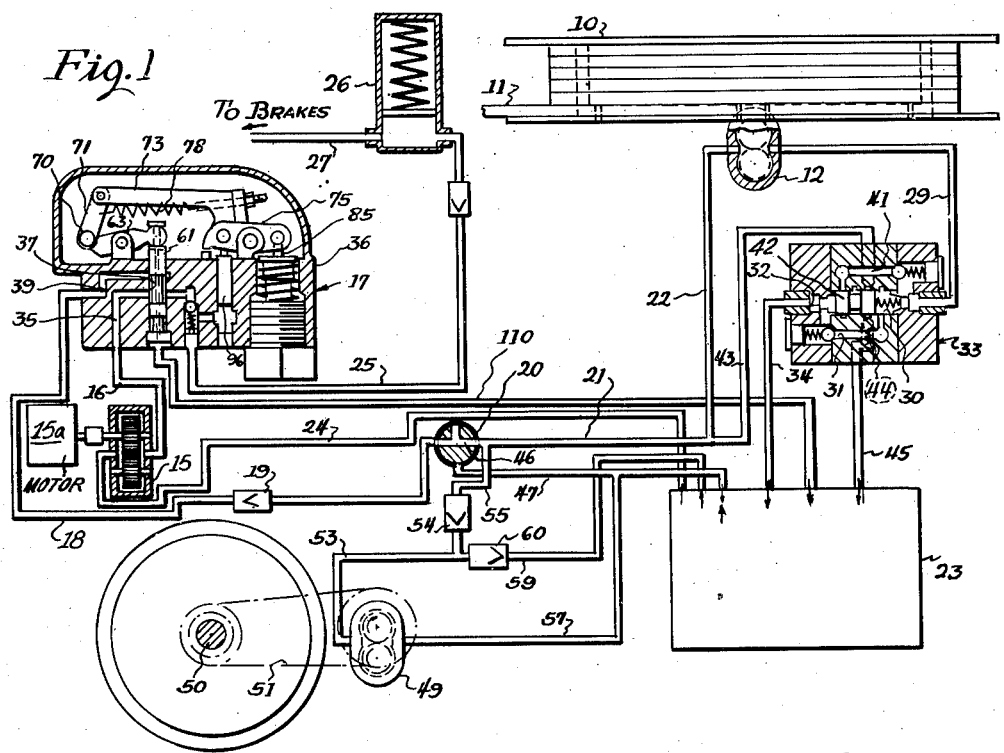
Figure 1 is a diagrammatic view illustrating a form of fluid circuit arranged in accordance with my invention, for driving a fluid motor operatively connected with a cable reel.
Figures 2, 3:
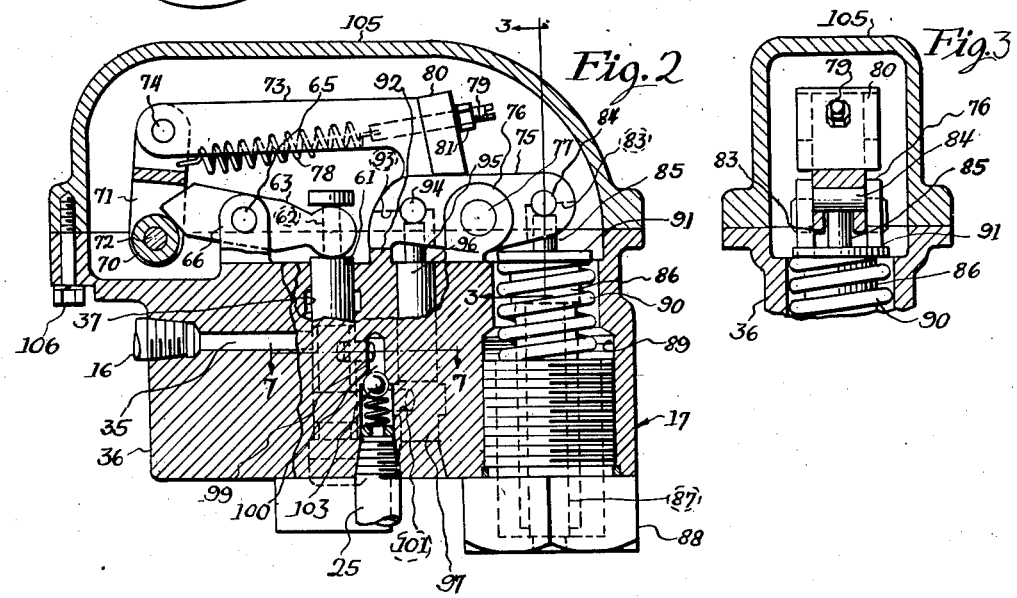
Figure 2 is an enlarged longitudinal sectional view taken through the pressure adjusting valve shown in Figure 1 as being connected in the fluid pressure system.
Figure 3 is a fragmentary transverse sectional view taken substantially along line 3—3 of Figure 2.

In Figure 1 of the drawings a cable reel 10 is diagrammatically shown as having an electric cable 11 wound thereon. Said cable is adapted to be connected at its free end to a source of electric power, to supply electric power to a vehicle such as an electric gathering locomotive. Said cable reel may be of any well known construction and is no part of my present invention, so will not herein be shown or described in detail. A fluid motor 12 is provided to rotatably drive said reel and may be directly connected thereto as by a bevel gear reduction (not shown). Said motor may be of a well known form of gear motor, and is no part of my present invention so is not herein shown in detail.

A fluid pump 15, herein shown as being a gear type of pump and driven by a suitable electric motor 15a, is provided to supply fluid under pressure to said fluid motor 12 through a pressure line 16, pressure regulating valve 17, a pressure line 18, check valve 19 arranged to prevent the return of fluid to said pressure regulating valve, a 2-way control valve 20, and pressure lines 21 and 22. The intake side of said pump is connected with a fluid storage tank 23 by means of an intake line 24.

A pressure line 25 is connected to and leads from the pressure adjusting valve 17 to the pressure side of an accumulator 26. A pressure line 27 leading from said accumulator is adapted to be connected to a brake control valve (not shown) to supply fluid under pressure to operate the brakes or other operative parts of the locomotive (not shown).

Fluid is returned from the fluid motor 12 to the tank 23 by means of a return line 29, valve chamber 30, and passageway 31 of a relief valve 33, and a return pipe 34 connected with said chamber. Said relief valve is similar to that shown and described in my prior Patent No. 2,395,302, which issued February 19, 1946, so need not here be shown or described in detail.

During normal operation of the locomotive when it is traveling towards its source of power supply, the pump 15 driven by its electric motor will supply fluid under pressure to drive the fluid motor 12 and reel 10 through the pressure line 16, passageway 35 in a block 36 for the valve 17, valve chamber 37 in said valve block, and out of said valve block to the pressure line 18 through a pasageway 39. Fluid will then flow through the pressure line 18 past the check valve 19, through the valve 20, pressure lines 21 and 22, to supply fluid under pressure to drive the fluid motor 12 in an obvious manner.

When the locomotive travels away from its source of power supply, the cable 11 connected to a fixed source of electric power will be payed off of its cable reel. This will cause said cable reel to drive the motor 12 as a pump. When said motor is being driven as a pump, fluid under pressure will be supplied to said motor through the return pipe 34, chamber 30 of the valve 33, passageway 41 and pipe 29, it being understood that suction on said pipe moves a piston valve 42 of said valve in a position to permit fluid to pass from the chamber 30 to and through the passageway 41 of said valve, as has been clearly shown and described in my Patent No. 2,395,302. Fluid discharged from said motor will pass through the pipe 22, pipe 43, to and through the valve 33, past a relief valve 44 in said valve, back to the tank 23 through a return line 45. The relief valve 44 is so set as to exert sufficient back pressure on the motor 12, when driven as a pump, to cause said motor to maintain tension on the cable 11 during the unwinding operation, as has been shown and described in my Patent No. 2,395,302. It should here be understood that the relief valve 44 also serves to relieve pressure from the pressure line 21 upon overload pressures in said pressure line.

When the 2-way valve 20 is turned to a position to connect a port 46 thereof to a return line 47, fluid will be returned from said pump and motor to the tank 23 through said return line.

Referring now to the means for supplying fluid under pressure to the fluid motor 12, to drive the cable reel 10 in a winding direction when power has been cut off of the locomotive circuit and the pump 15 is not in operation, a second fluid pump 49 is provided. Said pump may be directly driven from the locomotive, as from an axle 50 thereof, through a chain and sprocket drive indicated generally by reference character 51, and is operatively connected with said axle at all times, so as to be driven therefrom whenever the locomotive is in motion. Said pump is driven in a direction to supply fluid under pressure to the pressure line 21 whenever the locomotive is moving towards the point where the free end of the cable 11 is connected to its source of power supply. The fluid connection from said pump to said fluid motor includes a pressure line 53 connected between said pump and the pressure line 21 and having a check valve 54 connected therein, to prevent the passage of fluid from said pressure line back to said pump. The intake side of the pump 49 takes fluid from the tank 23 through an intake pipe 57 connected with the return pipe 47. A return pipe 59 is connected between the pipe 53 and the tank 23. Said pipe has a check valve 60 therein connected to prevent the discharge of fluid under pressure through said pipe, and serves as an intake pipe for the pump 49 whenever the locomotive is travelling away from its source of power supply.

Whenever the locomotive is moving towards its source of power supply and power is supplied thereto through the cable 11, the pumps 15 and 49 will supply fluid under pressure to the fluid motor 12, to drive said motor and the cable reel 10 in a winding direction. When, however, the power goes off or the cable 11 becomes disconnected from its source of power, or power in the locomotive circuit is interrupted, and the locomotive is moving towards its source of power, the pump 15 will be inoperative to supply fluid under pressure to the motor 12, but the pump 49 being driven through the locomotive axle 50, will supply fluid under pressure through the pressure lines 53, 21 and 22, to said motor 12, to drive said motor and assure that the winding operation of the cable reel 10 continues until the locomotive stops or until power is again supplied to the locomotive through said cable. Also when the brakes are set and the wheels slide, the pump 49 will be inoperative to supply fluid pressure to the reel drive motor 12, but the pump 15 will supply fluid pressure to said reel drive motor as long as there is power to drive said pump.

If during the winding operation of the cable reel 10, pressure in the pressure line 25 and the accumulator 26 drops below a predetermined value, the pressure regulating and relief valve 17 will move to a position to stop the passage of fluid through passageway 39 and pipe 18, in a manner which will hereinafter more clearly appear as this specification proceeds, and fluid to operate the motor 12 will be supplied to operate said cable reel by means of the pump 49 until said pressure again reaches its predetermined value.

The pressure regulating valve 17 is a mechanically operated type of valve so as to have a quick opening and closing of the port leading to the passageway 39 and so as not to be affected by viscosity of oil and temperature, and serves as a series valve to connect the pump 15 with the accumulator 26 and reel drive motor 12. Said valve also serves to keep pressure in the line 25 and accumulator 26 up to a predetermined value when the pump 15 is connected to supply fluid to the motor 12. It further serves as a by-pass valve when said pump is connected to return fluid to the tank 23 through the pipes 18 and 47.

The valve 17 includes a valve piston 61 movable in the valve chamber 37 and adapted to be moved to a position to block the passage of fluid through the pressure passageway 39 when pressure in the pipe 25 drops below a predetermined value. Said valve piston, as herein shown, has a stem 62 projecting upwardly from the upper end thereof. Opposite sides of said stem are flattened and have the furcations of a bifurcated end of a lever arm 63 extending therealong. Said furcations are rounded at their ends and slidably engage the top of the piston 61 and the bottom of a head 64 on the upper end of said stem, so as to move said valve piston along said valve chamber upon rocking movement of said lever arm. Said lever arm is pivoted intermediate its ends on a pivotal pin 65 mounted at its ends on spaced brackets 66, 66 extending upwardly from the valve block.

The end of the lever arm 63 opposite from the valve piston 61 is in the form of a V with its apex intersecting the longitudinal center of said lever arm. Said end of said lever arm 63 forms a cam which is yieldably engaged by a roller 70, which serves to instantaneously pivot said lever arm upon movement of said roller 70 to either side of the apex of said V. Said roller is mounted adjacent the lower end of and between the spaced side straps of a link 71 on a pin 72. Said link 71 is pivoted at its upper end on the end of an arm 73 on a pivotal pin 74. Said arm extends upwardly and outwardly from a rocking member 75, pivotally mounted intermediate its ends, between two spaced brackets 76, 76, on a pivotal pin 77. A tension spring 78 extends along said arm 73 and is connected at one of its ends to the link 71 and at its opposite end to a threaded member 79, threaded in a rear end portion 80 of said arm 73. The outer end of said threaded member is slotted to permit adjustment of the tension of said spring and the pressure of said roller 70 against the V-shaped end of said lever arm, and thus adjust the differential pressure at which said valve piston 61 will move to an open or closed position. A lock nut 81 is threaded on said threaded member and abuts the outer end of said rear end portion, to lock said threaded member in position.

The spring 78 serves to engage the roller 70 with the inclined sides of the V-shaped end of the lever arm 63, and the tension of said spring is such that when said roller passes the apex of said end of said lever arm and engages the lower V-shaped side thereof, said end of said lever arm will be instantaneously pivoted upwardly about the axis of the pin 65, to move the valve piston 61 downwardly along the valve chamber 37 and block the passage of fluid from said valve chamber through the passageway 39. When said link 71 moves in an upward direction by pivotal movement of the arm 73, and said roller engages the upper inclined side of said lever arm 63, said roller engaged with said lever arm by said spring 78, will instantaneously depress said end of said lever arm and move said valve piston upwardly into position to admit fluid under pressure from said valve chamber through said passageway 39, thus making a quick acting valve which will avoid any throttling action of fluid supplied by said pump to the passageway 39.

The rocking member 75 is provided with a rear downwardly opening recessed portion 83. A pivotal pin 84 is mounted in said rocking member and extends downwardly within said recessed portion and is adapted to be engaged by the upper end of a plunger 85.

The plunger 85 is herein shown as extending upwardly from a guide cylinder 86, slidably mounted on a guide rod 87 threaded in the lower end of and projecting upwardly from a hollow adjusting nut 88. Said adjusting nut is threaded within a lower open portion of a chamber 89 in the valve block 36, which opens to the upper end of said valve block. A spring 90 encircles said guide cylinder and is interposed between the bottom of the hollow portion of said nut 88 and a flange 91 at the upper end of said cylinder, so as to urge said plunger in an upward direction along said rod 87 and move the rocking member 75 and arm 73 about the pivotal pin 77 in a direction to depress the link 71 and roller 70. A stop 92 limits movement of said rocking member in a counterclockwise direction.

The end of the rocking member 75 opposite from its rear recessed portion 83 is provided with a recessed portion 93, opening to the spaced end to the forward end of said rocking member. A pin 94, mounted in said rocking member, extends downwardly within said recessed portion. Said pin is adapted to be engaged by a plunger 95 extending upwardly from a piston 96, which is movable in a surge chamber 97. Said plunger is adapted to move said rocking member 75 in a clockwise direction upon a predetermined pressure in said surge chamber. The cylinder 86 engaging the bottom of the inside of the hollow nut 88 serves to limit movement of said rocking member in a clockwise direction.

Fluid under pressure enters the surge chamber 97 from the passageway 35 and valve chamber 37 to move the plunger 95 against the action of the plunger 85 and pivot the rocking member 75 in a clockwise direction, through a passageway 99, a vertically drilled passageway 100 formed in the valve block 36, and a passageway 101 connected with said vertically drilled passageway beneath a spring pressed ball type check valve 103. Fluid under pressure leaves said valve block through the pipe 25 threaded in the lower end of the passageway 100.

When the pump 15 is supplying fluid under pressure to operate the reel 10 and pressure in the pressure line 25 is at a predetermined value, the rocking member 75 and arm 73 will be held against the spring 90 in the upwardly inclined position shown in Figure 5. The roller 70 will thus engage the upper inclined side of the V-shaped end of the lever arm 63 and hold the valve piston 61 in an elevated position, so fluid under pressure may pass through the passageway 39 to and through the pressure line 18.

When pressure in the pressure line 25 is reduced below a predetermined value, the spring 90 and plunger 85 will pivot the rocking member 75 and arm 73 in a counterclockwise direction against the piston 96. This will cause the roller 70 to move downwardly past the apex of the V-shaped end of said lever arm 63, into engagement with the lower inclined side thereof. The instant said roller passes downwardly past the apex of said V-shaped end of said lever arm, said end of said lever arm will move upwardly and the opposite end of said lever arm will be depressed. This will instantaneously move the valve piston 61 downwardly to close the passageway 39 and block the passage of fluid under pressure through the pressure pipe 18. When pressure in the pressure line 25 and accumulator 26 has again been built up to a predetermined value, the plunger 95 will move said rocking member in a clockwise direction against the spring 99 which will cause the roller 70 to move the valve piston 61 upwardly to quickly open the passageway 39 to the valve chamber 37.

When the 2-way valve 20 is turned to a position to permit the discharge of fluid from the pressure line 18 through said 2-way valve and through the return line 47 into the tank 23, and the pressure regulating valve 17 is in the position shown in Figures 1 and 5, fluid from the pump 15 will be by-passed through the passageway 39 and pressure line 18 to the tank 23. When, however, pressure in the chamber 97 and pipe 25 is reduced beneath a predetermined value, the spring 90 will move the plunger 85 upwardly to pivot the rocking member 75 in a counterclockwise direction and depress the valve piston 61 in the valve chamber 37 and block the passage of fluid through the passageway 39, to again permit the pump 15 to build up pressure in the pressure line 25 and accumulator 26.

The valve 17 thus acts as a series valve and as a pressure regulating valve during operation of the cable reel 10 and acts as a by-pass valve when the 2-way valve 20 is connected to discharge fluid from the pressure line 18 to the tank 23. When said valve 17 is serving as a pressure regulating valve and the passageway 39 is closed to prevent fluid under pressure from passing through the pressure line 18, the pump 49 supplies fluid under pressure to the fluid motor 12, to prevent interruption in the winding operation of the cable reel 10.

The valve block 36 is provided with a cover 105 which closes its upper end and is secured thereto by means of machine screws 106, 106. Fluid leaking by the pistons 96 and 61 into the chamber formed by the inside of the cover 105 serves to lubricate the operating parts of said valve and excess fluid leaking by said pistons is returned to the tank 23 through a cross-drilled portion 107 of said valve piston 61, herein shown as being disposed adjacent the upper end thereof (see Figure 6). Said cross-drilled portion communicates with a passageway 109 extending through the center of said valve piston and opening to the lower end thereof. Fluid passing through said passageway is returned to the tank 23 through a return line 110.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In combination, a cable reeling mechanism adapted to be mounted on a gathering locomotive and supply power thereto, said cable reeling mechanism including a reel, a cable adapted to be wound on said reel and be connected at its free end with a source of electric power, a fluid motor for driving said reel in a direction to wind cable thereon, a fluid pump operated by electric power supplied by said cable, for supplying fluid under pressure to said motor, for operating said motor, and other means for supplying fluid under pressure to said motor, for causing said motor to drive said reel when the electric power connection to said pump is broken, to prevent said cable from becoming slack and prevent the locomotive from running over said cable, including a second pump, said second pump being operated by travel of the locomotive so as to be driven therefrom and to supply fluid under pressure to said reel drive motor, to drive said motor and reel as long as the locomotive is moving.

2. In combination, a cable reeling mechanism adapted to be mounted on a gathering locomotive and supply power thereto, said cable reeling mechanism including a reel, a cable adapted to be wound on said reel and connected at its free end with a source of electric power, to conduct electric power to said gathering locomotive, a fluid motor for driving said reel in a direction to wind cable thereon, a fluid pump operated by electric power supplied by said cable, fluid connections from said pump to said motor, for supplying fluid under pressure to said motor from said pump, a second pump driven by a wheel of the locomotive, a fluid connection from said pump to said fluid connections connecting said first mentioned pump with said motor, for supplying fluid to drive said motor as long as the locomotive is moving towards its source of electric power, said fluid connection including a check valve arranged to permit said second pump to supply fluid to said first fluid connection from said first pump to said motor, but to prevent fluid from passing from said first pump to said second pump when the direction of travel of the locomotive is reversed, to travel in a direction to pay off cable from said reel, and said first pump serving to supply fluid under pressure to drive said fluid motor during slippage of the locomotive wheels.

3. In combination, a cable reeling mechanism adapted to be mounted on a gathering locomotive, said cable reeling mechanism including a reel, a cable on said reel and adapted to be connected at its free end to a source of electric power and conduct electric power to said gathering locomotive, a fluid motor for driving said reel in a direction to wind cable thereon, a fluid storage tank, a fluid intake connection from said tank to said pump, a fluid connection from said pump to said motor for supplying fluid under pressure thereto, to operate said motor, a second pump, means for driving said pump from a wheel of the locomotive, a fluid connection from said second pump to said fluid connection from said first mentioned pump to said motor, for supplying fluid to drive said motor as long as the locomotive is moving in a direction towards said source of power, to prevent said cable from becoming slack and prevent the locomotive from running over said cable, a check valve in said last mentioned fluid connection, to prevent fluid under pressure from passing from said motor to said second pump, when the direction of travel of the locomotive is reversed and said motor is driven by said reel as a pump, and a connection from said last mentioned fluid connection to said tank, said connection having a check valve therein to prevent the discharge of fluid under pressure through said connection to said tank, but permitting said pump to take fluid from said tank when the direction of travel of said locomotive reverses.

4. In combination, a gathering locomotive, a fluid storage tank, a pump, a fluid connection from said tank to said pump, an accumulator, a fluid connection from said pump to said accumulator for supplying fluid under pressure thereto, to permit said accumulator to store fluid under pressure to operate the brakes of the locomotive, a reel, a cable on said reel adapted to be connected at its free end to a source of electric power and conduct electric power to said locomotive, a fluid motor for driving said reel in a direction to wind cable thereon, said motor being driven by said reel as a pump during the unwinding operation, a fluid connection from said pump to said motor for supplying fluid under pressure thereto, valve means for maintaining a back pressure on said motor when being driven as a pump during unwinding, to cause said motor to maintain tension on said cable during unwinding, and a second pump, a drive connection from a wheel of the locomotive to said pump, for driving said pump to supply fluid under pressure to said reel motor whenever the locomotive is moving towards its source of power, to assure that said reel always be driven in a winding direction when power is disconnected from the locomotive and said first pump is not in operation.

5. In combination, a gathering locomotive, a fluid storage tank, a pump, a fluid connection from said tank to said pump, an accumulator, a fluid connection from said pump to said accumulator for supplying fluid under pressure thereto, to permit said accumulator to store fluid under pressure to operate the brakes of the locomotive, a reel, a cable on said reel and adapted to be connected at its free end to a source of electric power and conduct electric power to said locomotive, a fluid motor for driving said reel in a direction to wind cable thereon, said motor being driven by said reel as a pump during the unwinding operation, a fluid connection from said pump to said motor for supplying fluid under pressure thereto, valve means for maintaining a back pressure on said motor when being driven as a pump during unwinding to cause said motor to maintain tension on said cable during unwinding, and a second pump, a drive connection from a wheel of the locomotive to said pump, for driving said pump to supply fluid under pressure to said reel motor whenever the locomotive is moving towards its source of power, to assure that said reel always be driven in a winding direction when power is disconnected from the locomotive and said first pump is not in operation, fluid connections from said tank to said second pump and from said second pump to said fluid connection from said first pump to said motor, and valve means in said fluid connections to prevent said second pump from taking fluid from said motor when the direction of travel of the locomotive is reversed to travel away from its source of power, to assure that tension be maintained on said cable during unwinding.

6. In combination, a gathering locomotive, a fluid storage tank, a pump, a fluid connection from said tank to said pump, an accumulator, a fluid connection from said pump to said accumulator for supplying fluid under pressure thereto, to permit said accumulator to store fluid under pressure to operate the brakes of the locomotive, a reel, a cable on said reel and adapted to be connected at its free end to a source of electric power and conduct electric power to said locomotive, a fluid motor for driving said reel in a direction to wind cable thereon, said motor being driven by said reel as a pump during the unwinding operation, a fluid connection from said pump to said motor for supplying fluid under pressure thereto, valve means for maintaining a back pressure on said motor when being driven as a pump during unwinding to cause said motor to maintain tension on said cable during unwinding, and a second pump, a drive connection from a wheel of the locomotive to said pump for driving said pump to supply fluid under pressure to said reel motor whenever the locomotive is moving towards its source of power, to assure that said reel always be driven in a winding direction when power is disconnected from the locomotive and said first pump is not in operation, and fluid connections from said tank to said second pump and from said second pump to said motor, to prevent said second pump from taking fluid from said motor when the direction of travel of the locomotive is reversed to travel away from its source of power, to assure that tension be maintained on said cable during unwinding, including an intake connection from said tank to said second pump, a pressure connection from said second pump to said fluid connection from said first pump to said motor, a check valve to prevent fluid from passing from said motor to said second pump, and a fluid connection to said tank from said fluid connection from said first pump to said motor, said fluid connection having a check valve therein to prevent the passage of fluid under pressure to said tank, but to permit fluid to be taken from said tank by said pump when said pump is being driven in a reverse direction.

7. In combination, a gathering locomotive, a fluid storage tank, a pump, a fluid connection from said tank to said pump, an accumulator, a fluid connection from said pump to said accumulator for supplying fluid under pressure thereto, to permit said accumulator to store fluid under pressure to operate the brakes of the locomotive, a reel, a cable on said reel and adapted to be connected at its free end to a source of electric power and conduct electric power to said locomotive, a fluid motor for driving said reel in a direction to wind cable thereon, a fluid connection from said pump to said reel motor for supplying fluid under pressure thereto, for driving said reel in a winding direction, and said fluid connection from said pump to said accumulator and from said pump to said reel including a pressure regulating valve, a connection from said valve to said accumulator, another connection from said valve to said reel drive motor, said valve being operable to close said fluid connection to said reel drive motor when the pressure into said accumulator is reduced below a predetermined value, and a second pump driven by a wheel of the locomotive for supplying fluid under pressure to said reel motor whenever the locomotive is moving towards its source of power, to assure that said reel be always driven in a winding direction, when said first pump is disconnected from its source of power and when said unloading valve is in position to block the passage of fluid from said first pump to said reel drive motor.

8. In combination, a gathering locomotive, a fluid storage tank, a pump, a fluid connection from said tank to said pump, an accumulator, a fluid connection from said pump to said accumulator for supplying fluid under pressure thereto, to permit said accumulator to store fluid under pressure to operate the brakes of the locomotive, a reel, a cable on said reel and adapted to be connected at its free end to a source of electric power and conduct electric power to said locomotive, a fluid motor for driving said reel in a direction to wind cable thereon, a pressure regulating and unloading valve, a pressure connection from said pump to said valve, a pressure connection from said valve to said accumulator, a pressure connection from said valve to said fluid motor, for supplying fluid under pressure thereto, a valve selectively operable to connect said last mentioned pressure connection to said tank, to stop operation of said reel, said pressure regulating valve being operable to block the flow of fluid under pressure from said pump to said motor when the pressure in said accumulator is reduced below a predetermined value, a second pump, a fluid connection from said pump to said connection from said pressure regulating valve to said motor, a drive connection from a wheel of the locomotive to said pump, for driving said pump in a direction to supply fluid under pressure to said motor whenever the locomotive is moving towards its source of power supply, to assure that said reel be driven in a winding direction when power is disconnected from the locomotive and said first pump is not in operation and when said pressure regulating valve is in position to block the passage of fluid from said first pump to said reel drive motor, and said locomotive is traveling towards its source of power.

9. In combination, a gathering locomotive, a fluid storage tank, a pump, a fluid connection from said tank to said pump, an accumulator, a fluid connection from said pump to said accumulator for supplying fluid under pressure thereto, to permit said accumulator to store fluid under pressure to operate the brakes of the locomotive, a reel, a cable on said reel and adapted to be connected at its free end to a source of electric power and conduct electric power to said locomotive, a fluid motor for driving said reel in a direction to wind cable thereon, said motor being driven by said reel as a pump during the unwinding operation, and valve means for maintaining a back pressure on said motor when being driven as a pump during unwinding, to cause said motor to maintain tension on said cable during unwinding, a pressure regulating valve, a pressure connection from said pump to said valve, a pressure connection from said valve to said accumulator, a pressure connection from said valve to said fluid motor, for supplying fluid under pressure thereto, a valve selectively operable to connect said last mentioned pressure connection to said tank, to stop operation of said reel, said pressure regulating valve being operable to block the flow of fluid under pressure from said pump to said motor when the pressure in said accumulator is reduced below a predetermined value, a second fluid pump, a fluid connection from said pump to said connection from said pressure regulating valve to said motor, a drive connection from a wheel of the locomotive to said pump, for driving said pump in a direction to supply fluid under pressure to said motor through said pressure connection from said pressure regulating valve to said motor, whenever the locomotive is moving towards its source of power supply, to assure that said reel be driven in a winding direction when power is disconnected from the locomotive and said first pump is not in operation and when said pressure regulating valve is in position to block the passage of fluid from said first pump to said reel drive motor, and the locomotive is traveling towards its source of power, and said fluid connections from said second pump to said motor including valve means to prevent said second pump from taking fluid from said motor when the direction of travel of the locomotive is away from its source of power and the direction of rotation of said pump is reversed, to assure that tension be maintained on said cable during the unwinding operation.

JOSEPH J. SLOMER.

REFERENCES CITED

The following references are of record in the file of this patent:

UNITED STATES PATENTS

| Number | Name | Date |
|---|---|---|
| 2,164,596 | Simonds | July 4, 1939 |
| 2,232,317 | Douglas | Feb. 18, 1941 |
| 2,339,378 | Clench et al. | Jan. 18, 1944 |
| 2,372,016 | Rockwell | Mar. 20, 1945 |
| 2,395,302 | Slomer | Feb. 19, 1946 |